Figure 1:
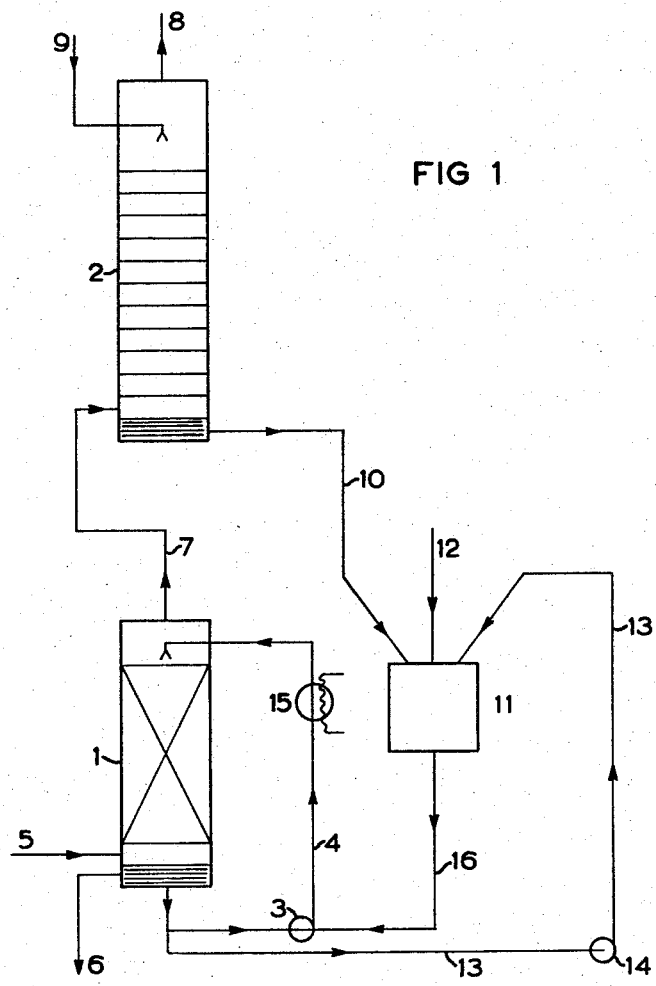

United States Patent Office 3,296,309
Patented Jan. 3, 1967

3,296,309
PROCESS FOR STABILIZING AN AQUEOUS FORMALDEHYDE SOLUTION
Abraham H. de Rooij, Geleen, Netherlands, assignor to Stamicarbon N.V., Heerlen, Netherlands
Filed July 22, 1963, Ser. No. 296,745
Claims priority, application Netherlands, July 27, 1962, 281,505
3 Claims. (Cl. 260—606)

The present invention relates to the stabilization of aqueous formaldehyde solutions.

It is well known that solution of formaldehyde in water which contain more than 30% by weight of formaldehyde are unstable, and in course of time become turbid at ambient temperature due to the formation of polymerization products, e.g., polyoxymethylene compounds. This turbidity can be prevented by the addition of a stabilizing agents, and the substance used to this end, in most cases, is methyl alcohol added in an amount within the range of 7 to 13% by weight, based on the weight of formaldehyde.

Other substances can also be used as stabilizers, such as urea, thiourea and phenol. Concentrated formaldehyde solutions containing, for example, 1 mole of such a stabilizer for each 4–20 moles of formaldehyde, remain clear. The concentrated formaldehyde solutions containing these stabilizers are suitable as starting materials in the preparation of synthetic resins from formaldehyde and the stabilizer. Such preparations may be effected by adding more of the stabilizer, e.g., urea, and heating and acidulating in a known fashion so as to bring about a condensation reaction.

According to the present invention, it has now been found that cyanuric acid can also be used as a stabilizer for formaldehyde solutions, and that such solutions remain clear for a long time if the molar ratio betwen formaldehyde and cyanuric acid in the solution has a value of 3 to 8. These solutions can also be used as starting materials in the preparation of the known formaldehyde-cyanuric acid synthetic resins.

A formaldehyde concentrate, i.e., a formaldehyde solution containing at least 30% by weight of formaldehyde, stabilized with cyanuric acid, can be obtained in convenient fashion by adding cyanuric acid to an aqueous solution of formaldehyde and concentrating the mixture by evaporation of water. It is also possible to prepare the formaldehyde concentrate containing cyanuric acid directly and continuously and without evaporation of water, by absorption of gases containing formaldehyde, e.g., gases obtained in a formaldehyde synthesis by oxidation and/or dehydrogenation of methyl alcohol. This can be effected by means of a circulating absorption liquid having the composition of the desired cyanuric acid/formaldehyde concentrate, to which solution cyanuric acid is constantly supplied, while the formaldehyde gas supplied to the system per unit time corresponds with the amount of formaldehyde in the cyanuric acid/formaldehyde concentrate discharged from the system.

To effect complete absorption of the formaldehyde with formation of the desired concentrated formaldehyde solution it is necessary to perform the absorption in a system comprising more than one stage. Thus, according to the invention, the formaldehyde gas is contacted in a first stage with a circulating absorption solution containing, in addition to 15 to 60% by weight of water, formaldehyde and cyanuric acid in the ratio of 3–8 moles of formaldehyde per mole to cyanuric acid. A portion of this circulating solution is continuously discharged from the first stage as the product to be recovered, the discharge occurring at such a rate that the amount of formaldehyde entrained in the discharge flow per unit time corresponds to the quantity of gaseous formaldehyde supplied. Formaldehyde not absorbed in the first stage is subsequently absorbed in a final absorption stage by means of continuously supplied water running in counterflow, and an amount of cyanuric acid is added per unit time to the resulting dilute formaldehyde solution to correspond with the amount of acid ultimately discharged from the first absorption stage in the recovered product, the resulting mixture of formaldehyde, cyanuric acid and water being supplied as make-up liquid to the liquid circulating over or through the first absorption stage.

The simplest way of carrying out the first absorption stage is to use an absorption column filled with packing bodies, while the final absorption stage may be obtained by the use of an absorption column equipped with plates. It is also possible, however, to use a column with packing bodies in the final stage or a plate column in the first stage.

In order to facilitate complete absorption of the non-absorbed formaldehyde in water and to limit the size of the absorption column needed in this process, it is possible, according to the invention, to use an intermediate absorption stage, in such a way that the gas discharged from the first absorption stage, which still contains formaldehyde, is contacted with a circulating absorption solution containing 15 to 35% by weight of formaldehyde and 85 to 65% by weight of water. This circulating solution is continuously discharged at such a rate that the amount of formaldehyde entrained per unit time in the discharged solution is equal to the amount supplied to the intermediate absorption stage as gaseous formaldehyde. The gaseous formaldehyde not absorbed in this intermediate stage is then absorbed in a final stage by means of water running in counterflow, the resulting dilute formaldehyde solution being added as make-up liquid to the absorption solution circulating over or through the intermediate absorption stage. Such an amount of cyanuric acid is also added to this solution discharged from the intermediate absorption stage as is ultimately discharged from the first absorption stage in the recovered product, and the resulting mixture of formaldehyde, cyanuric acid and water is added as make-up liquid to the absorption liquid circulating through the first absorption stage.

In order to avoid condensation of a solid formaldehyde/cyanuric acid product in the make-up liquid supplied to the first absorption column, this liquid is preferably strongly diluted, for instance, in the ratio 1:6, with a portion of the liquid circulating through the first absorption column, which is returned to the column with the make-up liquid.

Formic acid may be formed in the circulating cyanuric acid/formaldehyde solution and this acid should be neutralized by the addition of a small amount of alkali. Due to the presence of the cyanuric acid, the absorption solution has a strong buffering capacity, so that the pH value can be maintained at 7 to 6.5 without difficulty. The pH value of the circulating formaldehyde solution is maintained at about 8 by continuous addition of alkali.

The heat released by the absorption of formaldehyde is removed by cooling and the temperature in the absorption columns is preferably maintained at a value between 45° and 60° C. At lower temperatures, the amount of water condensing is too large and recovery of a concentrated formaldehyde solution is impossible, while at higher temperatures, virtually complete absorption of the formaldehyde presents difficulties.

Figure 2:
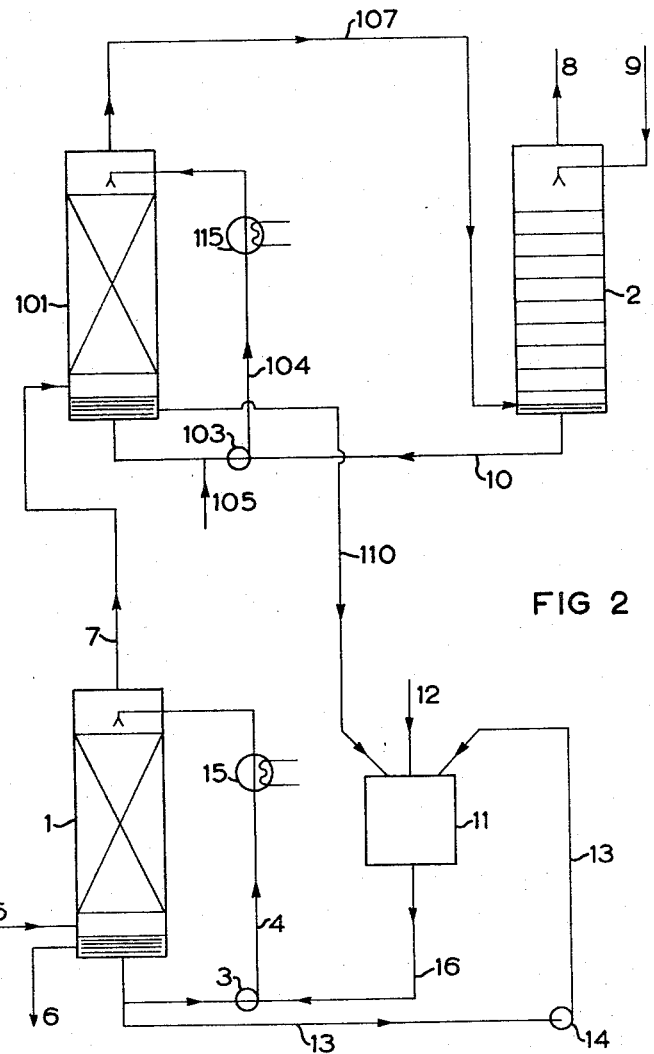

The invention is illustrated, but not limited by reference to FIGURES 1 and 2 wherein FIGURE 1 shows a process comprising two absorption stages and FIGURE 2 shows a modification thereof including an intermediate stage.

As shown in the drawings, the first absorption stage consists of an absorption column 1, a pump 3 and conduit 4 through which absorption solution is circulated, the solution being withdrawn from the bottom of column 1 and pumped upwardly through conduit 4 back into the top of the column. Heat of absorption is removed by a cooler 15 and the synthesis gas containing formaldehyde is supplied to the column through a conduit 5, a part of the concentrated formaldehyde solution obtained being discharged from the system through conduit 6 as the recovered product. Residual gas containing formaldehyde leaves the top of the column through conduit 7 and, in the embodiment of FIGURE 1, this residual gas is fed into the bottom of column 2, while in FIGURE 2, the gas is supplied to the intermediate stage, as will be more apparent hereinafter.

The final absorption stage is represented by column 2, to which water is continuously supplied through a conduit 9. Waste gases, which are almost completely free of formaldehyde, leave this column through conduit 8.

The dilute formaldehyde solution produced in the column 2 is discharged at the bottom of the column through conduit 10. According to the arrangement shown in FIGURE 1, this discharged solution is conveyed to a mixing vessel 11, to which cyanuric acid is also supplied through conduit 12. Additionally, a part of the absorption solution taken off at the bottom of column 1, e.g., 3 to 8% by volume thereof, is supplied through conduit 13 and pump 14 to vessel 11, and from this vessel, the resulting mixture is supplied via conduit 16 to the liquid circulating through the system comprising column 1, pump 3, conduit 4 and cooler 15.

According to the embodiment of FIGURE 2, the dilute formaldehyde solution obtained in the final absorption stage 2 is withdrawn from the bottom of the column and passes through conduit 10 to the intermediate absorption stage. The latter comprises an absorption column 101 through which absorption liquid is circulated via pump 103 and conduit 104, the liquid being withdrawn from the bottom of the column and being pumped upwardly through conduit 104 and cooler 115 into the top of the column. The heat of absorption in the circulating solution is removed by the cooler 115. Sodium hydroxide, which is used to keep the pH value constant, is supplied to the circulating solution just before pump 103 by means of conduit 105.

As shown in FIGURE 2, the gases leaving the column 1 through conduit 7 are fed into the bottom of the intermediate column 101. The gases leaving this intermediate column are supplied to the final absorption column 2 through conduit 107, while a portion of the absorption liquid (e.g., 0.5 to 2% by volume thereof) is continuously fed from column 101 through conduit 110 to mixing vessel 11. Cyanuric acid is also supplied to vessel 11 via conduit 12 and absorption solution from colunmn 1 is fed thereto through conduit 13 and pump 14. The resulting mixture flows from vessel 11 through conduit 16 to join absorption solution circulating through column 1 adjacent pump 3.

The following example further illustrates the present invention using the system shown in FIGURE 2:

19,700 cu. m./h. of a synthesis gas mixture having a temperature of 135° C. and a pressure of 1.07 atm. were supplied to column 1. This gas mixture comprised 1050 kg. of formaldehyde and 985 kg. of water vapor, the rest being mainly nitrogen and oxygen.

An absorption solution of the following composition: 42.0% by weight of formaldehyde, 30.0% by weight of cyanuric acid, 28.0% by weight of water, was fed into the top of column 1 at the rate of $2 \times 10^5$ kg. per hour. This solution contained 5.9 moles of formaldehyde per mole of cyanuric acid.

778 kg. of formaldehyde were absorbed per hour in column 1 representing an absorption efficiency in the first absorption stage of 74%. The gases leaving the column had a temperature of 55° C. and 136 kg. of formaldehyde were absorbed from these gases in column 101 by an absorption solution of the following composition: 28.0% by weight of formaldehyde, and 72.0% by weight of water, circulating through the column at the rate of $10^5$ kg. per hour.

The gases leaving column 101 were subjected to a final absorption process in column 2, by washing them with water running in counterflow at the rate of 315 kg./hour. As a result, 136 kg. of formaldehyde were dissolved in the water and simultaneously 385 kg. of water vapor were condensed.

Tank 11 was supplied with formaldehyde solution through conduit 110 at the rate of 972 kg./hour. Cyanuric acid was also supplied to tank 11 through conduit 12 at the rate of 750 kg./hour and absorption liquid was supplied thereto through conduit 13 at the rate of 10,000 kg./hour. The resulting mixture was then fed through conduit 16 for admixture with the absorption liquid circulated back into column 1.

The recovered product was drawn off from column 1 through conduit 6 at the rate of 2500 kg./hour (1050 kg. of formaldehyde, 750 kg. of cyanuric acid, 700 kg. of water).

Various modifications may be made in the invention described herein without deviating from the scope thereof as set forth in the following claims wherein, I claim:

1. Process for preparing a concentrated formaldehyde solution, suited as starting material in the preparation of formaldehyde-cyanuric acid synthetic resins, by absorption of formaldehyde from formaldehyde containing gas in an absorption system comprising more than one absorption stages wherein the formaldehyde gas is passed into a first stage through which an aqueous absorption liquid is circulated comprising in addition to 15–60% by weight of water, formaldehyde and cyanuric acid in the ratio of 3–8 moles of formaldehyde per mole of cyanuric acid, a portion of this circulating solution being discharged continuously from the system to give the desired product wherein the amount of discharged solution is such that the amount of formaldehyde entrained therein per unit time corresponds to the quantity of gaseous formaldehyde supplied to said first stage and wherein formaldehyde gas not absorbed in the first stage is subsequently absorbed in a final absorption stage by means of a continuous flow of water running in counterflow to the gas and cyanuric acid is added to the resulting solution in an amount such that per unit time the amount of added cyanuric acid corresponds with the amount of acid discharged in the desired product recovered from the first stage, the resulting mixture of formaldehyde, cyanuric acid and water being added as make-up liquid to the liquid circulating through the first stage.

2. The process of claim 1 including the further steps of providing an intermediate stage, contacting the formaldehyde-containing gas leaving the first stage with an absorption solution circulating over and through said intermediate stage and containing 15 to 35% by weight of formaldehyde, withdrawing a part of this solution from this intermediate stage at a rate such that the amount of formaldehyde entrained per unit time in the discharged solution is equal to the amount of gaseous formaldehyde supplied to said intermediate stage from said first stage, absorbing gaseous formaldehyde not absorbed in said intermediate stage in said final stage with water in counterflow; adding the resulting dilute formaldehyde solution as make-up liquid to said intermediate absorption stage; adding an amount of cyanuric acid to the solution discharged from the intermediate absorption stage which is equal to the amount of acid ultimately discharged from the first absorption stage in the recovered product and adding the resulting mixtures of formaldehyde, cyanuric acid and water as make-up liquid to the absorption solution circulating over and through the first absorption stage.

3. The process of claim 2 wherein the make-up liquid added to the solution circulating through the first stage is first diluted with absorption solution from said first stage.

References Cited by the Examiner

UNITED STATES PATENTS 2,570,215  10/1951  Dice _____ 260—606

FOREIGN PATENTS 420,525  11/1926  Great Britain.

OTHER REFERENCES

Walker: Formaldehyde (1953), pages 47, 103.

BERNARD HELFIN, *Primary Examiner.*

LEON ZITVER, *Examiner.*